July 16, 1963

H. N. ARNOLD 3,097,616

PLANTER

Filed Dec. 19, 1956

Inventor
Henry N. Arnold
by Roberts, Cushman & Grover
Attys

July 16, 1963  H. N. ARNOLD  3,097,616
PLANTER

Filed Dec. 19, 1956

Inventor
Henry N. Arnold
by Roberts, Cushman & Grover
Attys

July 16, 1963   H. N. ARNOLD   3,097,616
PLANTER
Filed Dec. 19, 1956   4 Sheets-Sheet 3

Inventor
Henry N. Arnold
by Roberts, Cushman & Grover
Att'ys

July 16, 1963  H. N. ARNOLD  3,097,616
PLANTER
Filed Dec. 19, 1956  4 Sheets-Sheet 4
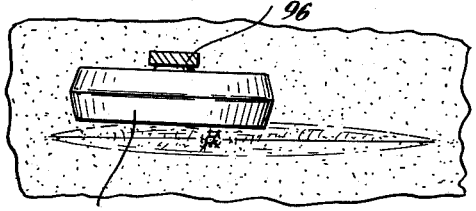
Fig. 8
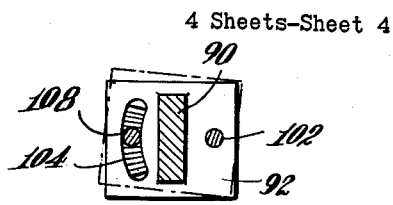
Fig. 11
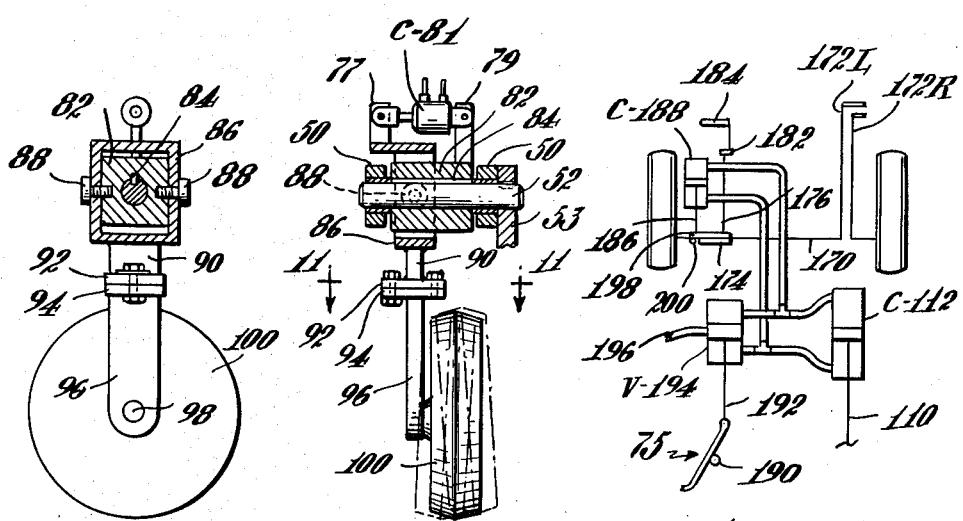
Fig. 9  Fig. 10  Fig. 14
Fig. 12
Fig. 13
Inventor
Henry N. Arnold
by Roberts, Cushman & Grover
Attys United States Patent Office 3,097,616
Patented July 16, 1963

3,097,616
PLANTER
Henry N. Arnold, 17 Exchange St., Providence, R.I.
Filed Dec. 19, 1956, Ser. No. 629,328
19 Claims. (Cl. 111—3)

This invention relates to a method of and apparatus for planting seedling and transplant trees and the like.

Planters are available for opening a continuous slot or furrow along the ground by means of a flat disk and plow-shaped foot so as to permit thrusting the roots of a seedling tree or plant thereinto, and then closing the slot or furrow at the base of the seedling. However, such apparatus requires that the ground be reasonably free of stones, roots and the like, and is only useful along substantially straight courses and/or gradually deviating courses for the reasons that the furrow opening and closing instrumentalities are generally widely spaced one behind the other with the result that on the one hand, if the leading instrumentality encounters an obstacle and is elevated thereby the trailing instrumentality will also be elevated and may thus be held out of contact with the ground until it has moved beyond the seedling and hence will not close the furrow and pack the earth about the seedling, and on the other hand, if the apparatus is required to make an abrupt detour to avoid an obstacle the trailing instrumentality is swung radially to one side or the other of the furrow and hence does not close and pack it. Furthermore a plow-shaped foot such as is conventionally employed accumulates so much trash that it impairs the proper formation of the furrow and requires that the apparatus be brought to a halt and cleared at frequent intervals. Thus apparatus of the kind available is of little value in rough, uncleared land where there are frequent obstacles which must be passed over or around.

The principal objects of this invention are to provide an apparatus which will operate successfully on uncleared and unprepared land which may be filled with rocks, roots, stumps, and the like, such as is encountered in the New England countryside, it being understood however that its special adaptation to such uncleared land does not prevent its used to even better advantage in land which is free of such obstacles. Another object is to provide an apparatus, the operating instrumentalities of which will not be rendered inoperative by the presence of roots or stones. Another object of the invention is to provide an apparatus, the operating instrumentalities of which will not be rendered inoperative by an accumulation of trash, roots and brush adjacent the course of its operation. Another object is to provide an apparatus in which its operating instrumentalities will not be rendered inoperative by declivities and mounds, or by following non-linear courses, such as may be required in confined areas and areas in which there are stumps, rocks, and the like. Other objects are to provide an apparatus which will lessen the danger of injury and discomfort to the operator. Still other objects are to provide an apparatus which requires no special skill to operate and little upkeep.

As herein illustrated, the apparatus is tractor drawn and comprises furrow opening and closing instrumentalities operable successively but with substantially no intervening linear movement after the furrow is opened for reception of a seedling and thereafter to close it. This is accomplished herein by mounting a concave colter disk and packing wheel on angularly spaced arms fast to a common shaft, rocking the shaft to bring the colter disk into furrow engagement with the ground while the tractor advances the apparatus, to make a furrow, inserting a seedling in the furrow close to the disk and then successively stopping the tractor, elevating the colter disk and lowering the packing wheel into contact with the ground, and advancing the latter along its arc of movement to and just beyond the place where the plant is inserted to close the furrow at the base of the seedling rearwardly and forwardly thereof. A hydraulic cylinder is employed to rock the shaft and controls are connected thereto, and to the tractor to stop the tractor just before the colter disk is elevated and thereafter to start the tractor just before the colter disk is brought back into contact with the ground, so as to insure such contact beyond the seedling just packed into the furrow.

The plane of the colter disk is preferably toed outward of the center line of the tractor with respect to the direction of travel and the packing wheel is spaced laterally therefrom and is adjustable both as to its lateral spacing and its camber. A deflector is mounted adjacent the convex side of the colter in a position to assist in holding the furrow open and to intercept or deflect trash, roots and the like. The deflector is pivotally and yieldably supported independently of the colter disk so as to be free to swing around or rise when encountering an obstacle and periodically to release trash caught by it.

The instrumentalities are mounted on a frame which in turn is pivoted on the tractor for vertical movement and there is suspension means connected at one end to the frame and at its other end to the tractor for holding the frame freely floating with one or the other of its operating instrumentalities engaged with the ground. Preferably said means includes a damper operable to cushion the downward movement of the frame.

Adjacent the instrumentalities is a carriage in which may be seated the planter and this is supported for vertical movement independently of the instrumentalities and has on its underside a runner inclined upwardly at its opposite ends so as to pass over obstacles without jolt. The carriage is also supported by means which may include a damper to cushion its vertical movement.

The invention will now be described in greater detail with reference to the accompanying drawings wherein:

FIG. 8 is a plan view taken on the line 8—8 of FIG. 7, showing the operation of the packing wheel in closing the furrow at the base of the seedling;

FIG. 9 is a side elevation of the packing wheel showing in section its support for transverse adjustment;

FIG. 10 shows the rock shaft on which the instrumentalities are mounted for rocking movement into and out of operative position and means for adjusting the packing wheel laterally;

FIG. 11 is a section taken on the line 11—11 of FIG.

10, showing the adjustment for changing the camber of the packing wheel;

FIG. 12 is a plan view of the clutch control;

FIG. 13 is an elevation of the clutch control; and

FIG. 14 diagrammatically illustrates the hydraulic system.

In the following description wherever the term "seedling" is used it is intended to cover any kind of plant, shrub, or tree whether in the form of a seedling or a transplant, and it is also to be understood that the term "furrow" means an opening formed by cutting or slitting the ground and then lifting the earth along one side upwardly and outwardly temporarily to expose a trench into which may be placed the roots of the seedling without bending the earth so far back as to detach or break it loose from the adjacent furrow thus making it possible to turn the soil back into substantially its original position.

Figure 1:
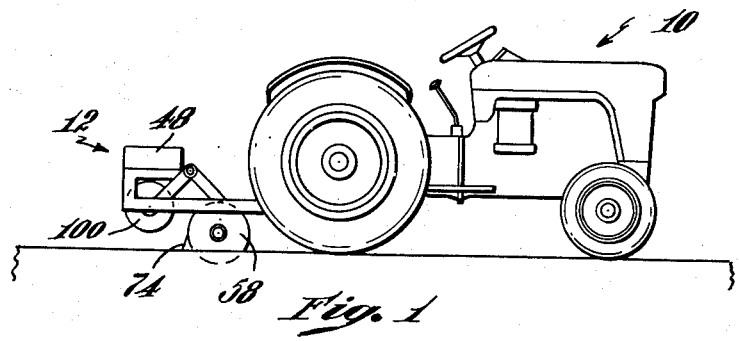
FIG. 1 is a side elevation of a tractor with the planting device connected thereto.
Figure 2:
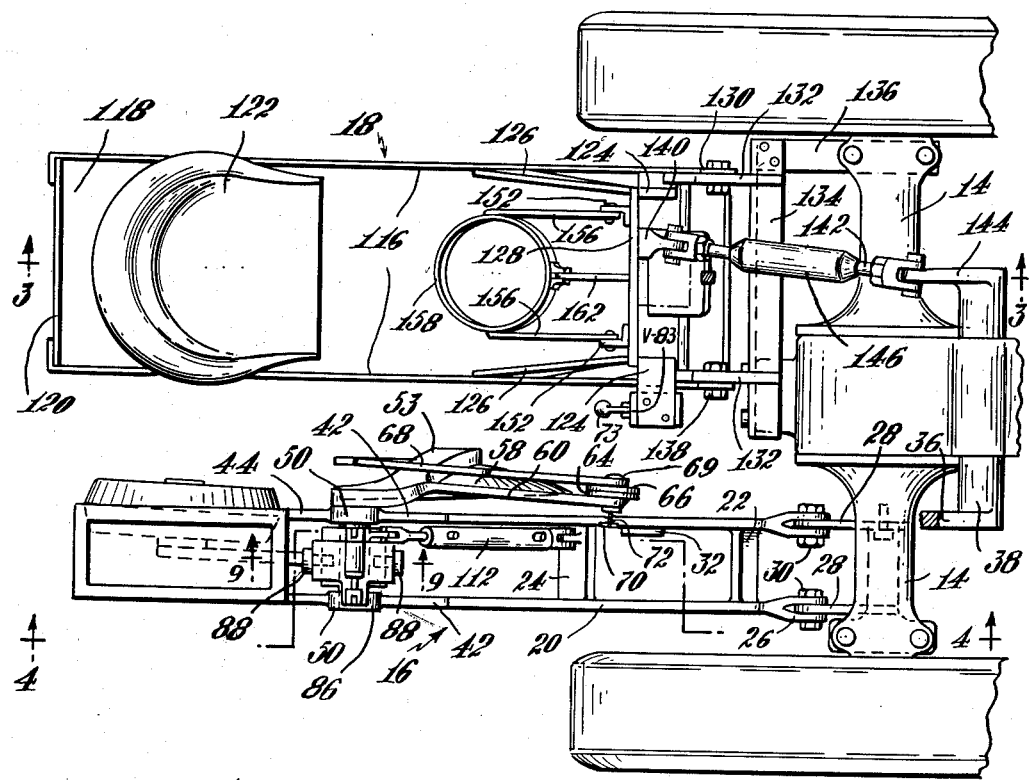
FIG. 2 is a plan view greatly enlarged of the rear part of the tractor, showing the planting device connected thereto.

Referring to FIGS. 1, 2, 3 and 6, there is shown a tractor 10, to which is tandemly connected a planter 12. The planter, as shown in FIG. 2, is comprised of a part 16 which makes a furrow along the ground and then closes it after a seedling is inserted in it, and a carriage 18 for supporting a planter adjacent the instrumentalities which form and close the furrow, together with a suitable container for the seedling and control mechanism.

The part 16 which mounts the operating instrumentalities is a rigid frame comprised of spaced parallel rails 20—20 (FIG. 2), rigidly joined near their forward ends by transversely extending rail sections 22 and 24. At their forward ends the rails 20—20 (FIG. 4) have upwardly extending portions which are bifurcated to receive the rear ends of bracket members 28—28, which are bolted to the underside of the axle housing 14 of the tractor. The bifurcated ends of the rails 20—20 and the rear end of the bracket arms 28—28 are pivotally joined by bolts 30—30, so that the frame is free to tilt in a vertical plane upwardly and downwardly as it is moved along the ground.

Figure 4:
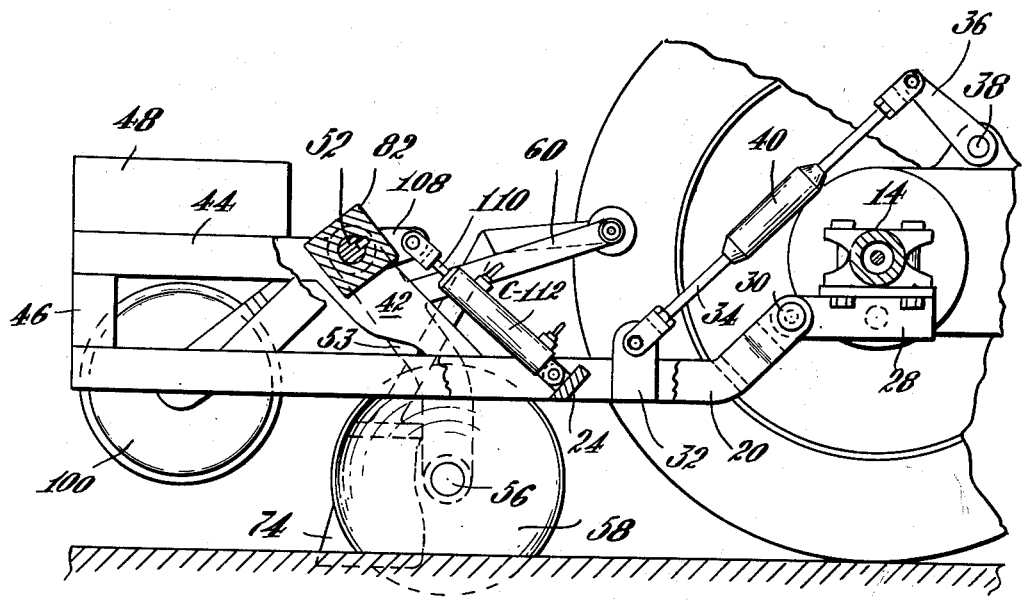
FIG. 4 is a vertical section taken on the line 4—4 of FIG. 2.

Fastened to one of the rails 20 (FIGS. 2 and 4) there is an eye plate 32 to which is connected one end of a supporting member 34, the opposite end of which is connected to an arm 36 fast to one end of a horizontally arranged shaft 38 journaled on the frame of the tractor adjacent the differential and operably connected thereto by suitable gearing, not shown, in such manner as to provide, when the occasion arises, for rocking the shaft 38 to elevate or lower the frame on its pivots 30—30. Thus the frame may be raised to an upwardly inclined position when traveling from one place to another to avoid damage to the instrumentality by pavement or large rocks, stumps, and the like. In its operative position the support 34 holds the frame in a free-floating position, as shown in FIG. 4, with one of its operating instrumentalities in contact with the ground. A damper 40 may be inserted between the ends of the support 34 to cushion vertical movement.

Rearwardly of its pivoted end the frame has rising from its rails 20—20, upwardly and rearwardly inclined arms 42—42 (FIGS. 2 and 7), at the upper extremities of which are rearwardly extending, horizontal rails 44—44, which parallel the rails 20—20 and the rear ends of which terminate at the rear ends of the rails 20—20 and are supported therefrom by a vertical leg 46, thereby forming a rigid box-like structure. A box 48 is mounted on the upper edges of the rails 44—44, the purpose of which is to contain weights, if it is found that the weight of the apparatus itself is not sufficient to cause the furrow forming instrumentalities to cut deep enough into the ground to make a furrow of suitable depth. For example, sand or stones placed in this box at the rear extremity of the frame will produce under most circumstances sufficient leverage in addition to the weight of the apparatus to cause penetration under the most adverse conditions.

Figure 6:
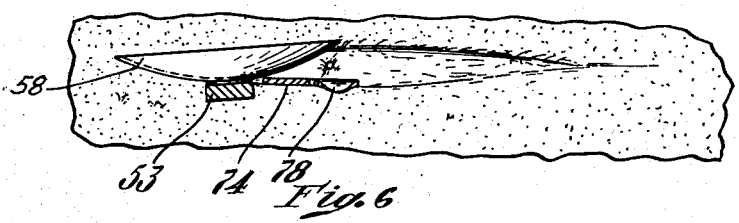
FIG. 6 is a plan view take non the line 6—6 of FIG. 5, showing the colter and guard holding the furrow open and the seedling inserted in place.
Figure 5:
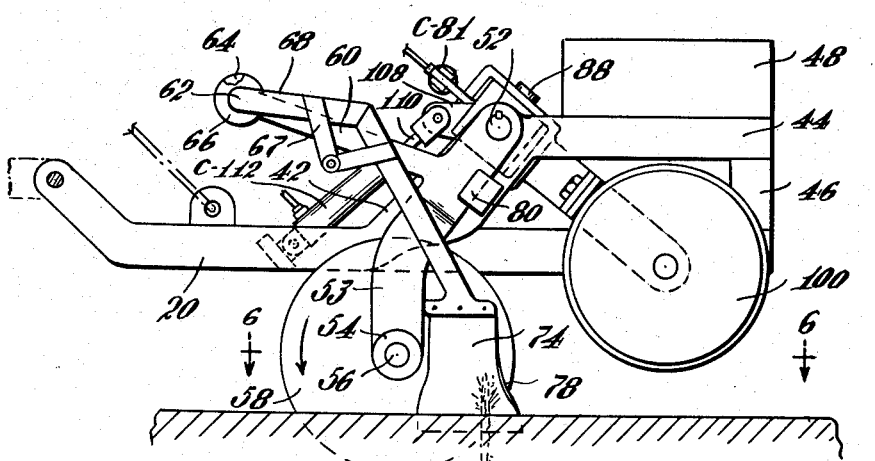
FIG. 5 is an elevation as seen from the left-hand side of FIG. 4, with the lower parts of the colter disk and guard in the ground in furrow forming position and showing a seedling inserted in the furrow close to the rear edge of the colter disk.
Figure 7:
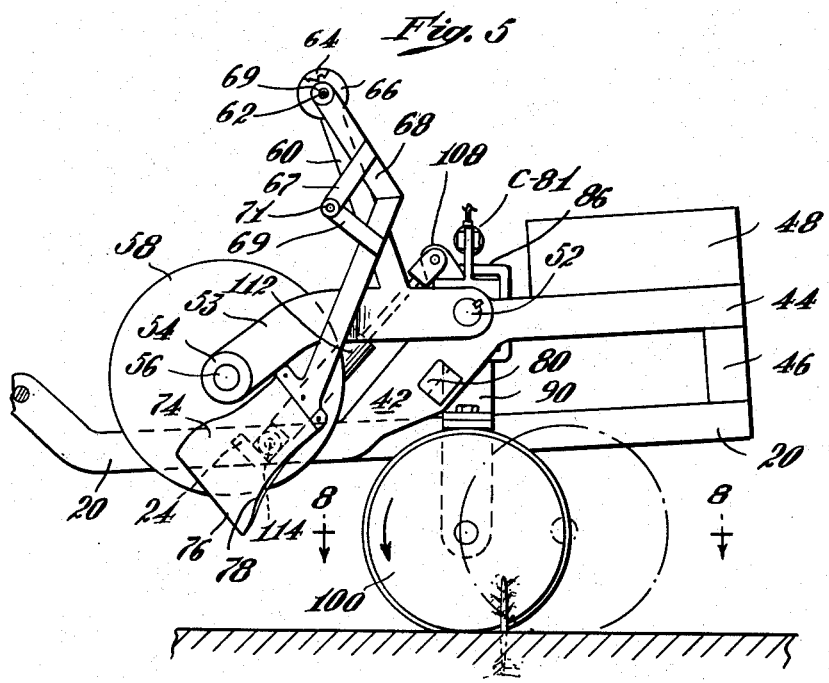
FIG. 7 is an elevation seen from the left side of FIG. 4, with the colter and guard elevated and with the packing wheel lowered into furrow closing position at substantially the spot from which the colter disk was elevated.

At the knees formed by the junction of the arms 42—42 and the rails 44—44 there are bearings 50—50 in which is journaled a horizontal shaft 52 (FIGS. 5, 7 and 10). On one end of the shaft 52 there is secured a leg 53, at the distal end of which there is a hub 54 to which is fixed a stub shaft 56, upon which is rotatably mounted a colter disk 58. The colter disk is of conventional kind, being concavo-convex and is mounted with its convex side facing the left with respect to the forward movement of the apparatus. The inner face of the disk is toed toward the center line of the tractor (FIG. 6) so as to make an angle with the forward movement, this being attained by shaping the leg 53 so that the axis of the stub shaft 56 is at an angle to the transverse axis of the tractor.

Mounted on the leg 53 there is a forwardly inclined arm 60 which has fixed to its extremity a leverage disk 64. There is a hole through the arm and disk in which there is mounted a pin 62 of smaller diameter than the hole. A second leverage disk 66, from which extends an arm 68, is mounted on the pin. The pin 62 has a head 69 on one end which engages the arm 68 and a head 70 on its other end between which end the outer side of the arm 68 there is placed a strong coiled spring 72, which holds the leverage disks 64 and 66 in engagement. The rearwardly extending arm 68 has a downwardly inclined limb to which is fastened a deflector guard or blade 74, which as shown in FIG. 5, is spade-shaped and is located rearwardly of the hub of the colter disk and in a plane which is substantially parallel to the direction of movement of the apparatus so that it makes an angle with the convex outer surface of the colter disk, as shown in FIG. 6, and preferably outwardly at a very small angle to the center line of the tractor. The lower edge 76 of the blade 74 drops into the furrow with the colter disk and forms with it as the colter disk turns up the furrow a substantially triangular space (FIG. 6) within the furrow, supported at both sides, into which the operator may place a seedling before any of the earth has a chance to fall back. The combination of the disk and the blade also form a wedge which serves to deflect loose brush, roots and stones along the course of travel so that the operator can place the seedling in the furrow without interference. To facilitate inserting the seedling the rear edge of the blade is turned outwardly at 78 to make room for the roots and the planter's hand.

To prevent injury to the arm 68 if the blade at its lower end is lowered into contact with a rock as the colter disk is rocked downwardly into operative position the arm is jointed at its elbow. This, as shown in FIGS. 5 and 7, is accomplished by dividing the arm at the elbow and pivotally connecting the sections at opposite sides thereof by toggle elements 67 and 69 pivoted to each other by a pin 71 and welded respectively, to the sections above and below the knee. As thus constructed when the colter disk is lowered from its elevated position (FIG. 7) if it strikes a rock the arm 68 will yield at its elbow without damage. When, however, the arm 68 is in operative position the joint is above the center line extending from the center of the pin 62 to the blade so that the upward thrust on the blade tends to straighten the arm.

A latch plate 80 fast to the arm 42 supports the leg 53 in its lowermost position so that its lower part in substantially vertical when in its operative position (FIG. 5), that is, perpendicular to the surface of the ground, and so that when the frame is substantially parallel to the ground the lower part of the colter disk will penetrate the ground a suitable distance for planting. Since the frame is pivoted at its forward end, if the colter disk encounters an obstacle such as a large rock or extremely tough root or stump it will ride over this obstacle without damage. The blade 74 is independently mounted for pivotal and lateral movement relative to the colter so that it may ride over or around an obstacle in its path without damage. The leverage provided by the yieldably engaged disks 64 and 66 and the weight of the arm 68 will retain the blade in a lowered position under normal earth resistance but will yield when a hard obstacle is met. The leverage afforded by the spring 72 and disks 64 and 66, the weight of the arm and blade and the angle of the blades suffices to return the blade to its operating position when it has passed beyond the obstacle.

Also mounted on the shaft 52 (FIGS. 9 and 10) is a block 82 of rectangular cross-section, the block being fixed to the shaft 52 by a key 84. On the block there is mounted a rectangular sleeve 86 which is of larger cross-section than the block. The sleeve is held in place by horizontally positioned pivot pins 88, extending through its walls and is thus pivotally supported so that it may be rocked about a horizontal axis passing through the pins at right angles to the longitudinal axis of the shaft 52. The sleeve 86 has extending downwardly therefrom a leg piece 90 having at its lower end a foot plate 92, to which there is bolted a head plate 94, from which there extends downwardly a leg 96. At the lower end of the leg 96 there is a stub shaft 98 upon which is rotatably mounted a packing wheel 100, having a broad peripheral surface which is transversely beveled so as to have a crown midway between its opposite sides. The foot plate 92 has, as shown in FIG. 11, a bolt hole 102 and an arcuate slot 104 through which bolts 108 extend into the head plate 94, the latter having in it a pair of bolt holes registering with the bolt hole 102 and the arcuate slot 104. As thus constructed the rocking movement afforded by the sleeve permits adjusting the packing wheel transversely and the angular movement about the axis of the leg permits adjusting the camber.

The lateral adjustment is important to compensate for sagging of the apparatus on a hillside due to the fact that the tractor tires are large and under low pressure which permits the whole tractor unit to shift to the low side. A conveniently located handle 73 provides for shifting the packing wheel in either direction, as will subsequently appear. The adjustment provided for changing the camber of the packing wheel makes it possible to increase or decrease the action of the wheel in reclosing the furrow. The crown surface of the wheel operates to produce both a rolling action and a lateral crowding action. The latter may be increased or decreased by changing the camber of the wheel. The crowding action is particularly important where there are matted roots in the soil which are resilient and elastic in nature and must be pressed and crowded back into place in order to keep them from springing upwardly again.

The block 82 has fast to it a short arm 108 (FIGS. 5 and 7) to which is pivotally connected one end of a piston rod 110, the opposite end of which is connected to a piston located in a cylinder 112. The cylinder is pivotally connected to the cross brace 24 and has fluid connections at its opposite ends for supplying fluid to either end thereof, thereby to rock the shaft 52. Since the colter disk 58 and the packing wheel 100 are mounted on legs which are fast to the shaft 52 and block 86 and are angularly disposed with reference to each other, rocking of the shaft will bring one into engagement with the ground and simultaneouesly elevate the other to an inoperative position. It is to be understood that the colter disk and packing wheel could be mounted on separate shafts if desired and each shaft operated independently of the other through appropriate mechanism.

As thus constructed, when the apparatus is dragged along the ground with the colter disk in contact therewith and the packing wheel elevated, as shown in FIGS. 4 and 5, the lower part of the colter disk cuts a furrow in the ground which forces the earth upwardly at one side, as shown in FIG. 6, exposing a furrow into which a seedling may be placed. The guard plate 74 holds trash and the like away from the furrow so that the operator has room to insert the seedling in place without injuring his hand, the lip 78 providing a wide mouth for receiving the roots of the seedling as it is thrust into the furrow.

After the seedling has been inserted in the furrow the planter trips a treadle 75 (FIG. 14) which, as will be described hereinafter, stops the tractor, applies its brakes and lifts the colter disk by rocking the shaft 52 so as to swing the leg 53 upwardly in a clockwise direction. Clockwise movement of the leg 53 lifts the colter disk 58 out of the furrow and simultaneously lowers the packing wheel 100 downwardly into engagement with the ground at the side on which the furrow has been lifted, so as to press the soil back into place and hence to close the furrow about the base of the seedling. Since the tractor has been brought to a stop the packing wheel moves downwardly on an arc which brings it into contact with the ground, close to the rear of the seedling and rolls it forwardly to a position somewhat ahead of the seedling, as shown in FIG. 7, without further forward movement of the apparatus thus rolling the soil at the side of the furrow downward and closing the furrow rearwardly and forwardly of the seedling so that packing may be accomplished without subsequent misalignment due to tractor movement.

Figure 3:
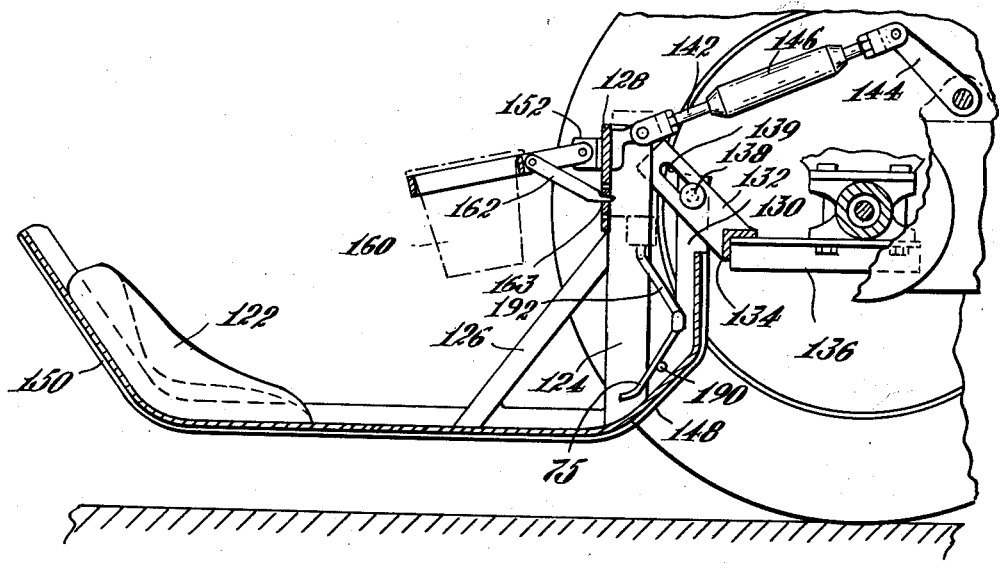
FIG. 3 is a vertical section taken on the line 3—3 of FIG. 2.

While the tractor is, of course, guided by a driver and is started and stopped by the driver in so far as is required for manipulation of the tractor as a motivating unit, control of the tractor for planting is effected by the planter from the part 18 which is in the form of a supported carriage 18 mounted parallel to the operating instrumentalities. The carriage is comprised of a pair of spaced parallel rails 116—116 (FIG. 2) joined at their rear ends by a plate 118 and a cross member 120, the rear ends being upwardly inclined (FIG. 3). A seat 122 is fastened between the rails 116—116. Near the forward ends of the rails 116—116 are vertically rising posts 124—124 fixed rigidly in place by braces 126—126 and a transversely extending plate 128. Forwardly of the posts 124—124 the rails 116—116 have upwardly inclined portions 130—130 which are pivotally connected to the rear ends of bracket arms 132—132. The forward ends of the bracket arms are fastened to an angle bar 134, which is in turn fastened to the axle housing of the tractor at one end by a bracket plate 136 and at its opposite end to the differential housing by suitable bolts (FIG. 2). Bolts 138 fixed in the upper ends of the portions 130—130 pivotally join these ends to the rear ends of the bracket arms 132—132 and provide for rearward and upward movement of the frame as a whole, along slots 139—139. An eye plate 140 is fastened to the plate 128 and the carriage is supported in a substantially horizontal position by a supporting element 142, one end of which is pivotally connected to the eye and the opposite end of which is pivotally connected to an arm 144 fastened to the shaft 38 which is mounted on the axle housing. There may be interposed in the element 142 a damper or shock absorber 146. The upwardly inclined portions 148 and 150 on the underside of the carriage at its opposite ends are of sufficient rigidtiy to resist deflection and to take a considerable amount of punishment so that as the carriage moves forwardly with the tractor these portions engage obstacles and alternately raise and lower the carriage with the minimum amount of shock. Downward movement of the carriage may also be damped by the element 142.

On the rear side of the plate 128 there is fastened a pair of bracket members 152—152 to which are pivotally connected arms 156—156 supporting between their rear ends a ring 158 in which may be placed a receptacle, for example, a water pail or bucket 160, for holding a quantity of seedling. A brace 162 is pivotally connected to the forward side of the ring and has on it a finger 163 for engagement with one of several vertically spaced openings in the plate so as to position the pail at a convenient angle.

On the tractor (FIGS. 12, 13 and 14) there is mounted a horizontal shaft 170 to which is fixed the left-hand one of two brake pedals 172L and 172R, each treadle being adapted to apply a braking action to the left and right wheels independently of each other. The shaft 170 is connected, as shown, diagrammatically to the brake mechanism of the left-hand wheel, this mechanism not being illustrated in detail because it is perfectly conventional. A sleeve 174 is loosely mounted on the shaft 170. One end of the sleeve has pivotally connected to it one end of a rod 176, the opposite end of which is connected to an arm 178 extending radially from the hub 180, fast to the tractor clutch shaft 182. The connection is by way of a pin 177 and slot 179. Extending forwardly from the hub is a clutch pedal 184. The clutch and brake may thus be operated independently by the tractor driver. The opposite end of the sleeve has pivotally connected to it one end of a piston rod 186 operating in a cylinder C–188. The treadle 75 (FIGS. 3 and 14) is pivotally mounted midway between its ends in an upwardly and forwardly inclined position on a horizontal rod 190 for rocking movement by pressing against its upper end forwardly in a clockwise direction and by pressing against its lower end for a reverse or counterclockwise movement. One end of a rod 192 is pivotally connected to its upper end and the other end of the rod is pivotally connected to the stem of a valve V–194 to which oil is supplied under pressure by conduits 196, the latter in turn being connected to the hydraulic system of the tractor. Conduits connect the opposite ends of the cylinders C–112 and C–188 to the opposite ends of the valve V–194 so that oil is delivered by way of the valve V–194 to corresponding ends of the cylinders C–112 and C–188. The cylinder C–188 is much shorter than the cylinder C–112, moreover, the power required to operate the clutch and brake rods is much less than that required to rock the shaft 52. As will be observed the system is open so that as oil is admitted to the two cylinders simultaneously the oil admitted to the shorter cylinder will effect actuation of the clutch and brake rods first since it responds to a lower pressure than the shaft 150. This, therefore, provides for stopping the tractor before the colter disk is elevated. In order to apply the brakes there is fastened to the sleeve 174 a foot 198 and to the brake rod a finger 200 which is engaged by the foot when the sleeve has turned far enough to bring the foot into engagement with the finger. Since there is no positive connection the driver is free to operate the clutch and apply the brakes independently of the planter and in turn the planter is free to declutch the tractor and apply the brakes independently of the driver. This is of considerable importance both from the standpoint of permitting the planter to stop and start the planter when he considers conditions best suited for planting, which could not be done by calling upon the driver who cannot see the furrow and would not be able to understand or respond quickly enough to directions shouted over the din of the tractor and safety for it the planter finds himself in difficulty he may instantly stop the tractor without reference to the driver who may not be attentive at that particular moment. When the tractor is brought to a stop by declutching and the application of the brakes the pressure builds up sufficiently to actuate the cylinder C–112 which rocks the shaft 52 to elevate the colter disk and simultaneously to lower the packing wheel. By tipping the treadle in the other direction after the seedling has been planted oil is delivered to the opposite ends of the cylinders C–188 and C–112. Because the cylinder C–188 is short it acts promptly to reclutch the tractor and release the brakes. The long travel of the piston and cylinder C–112, however, provides an appreciable delay before the shaft 52 is rocked so that lowering of the colter disk is delayed sufficiently to permit the tractor to travel forwardly far enuogh so that the colter disk will not come down on top of the previously planted seedling.

Referring to FIGS. 9 and 10, there are fastened respectively, to the block 82 and sleeve 86 spaced upright arms 77 and 79. A small cylinder C–81 is pivotally connected to one of the arms and a piston rod which protrudes from the cylinder is pivotally connected to the other arm. Oil pressure from the tractor hydraulic system is supplied to the opposite ends of the cylinder through conductors, by way of a hand operated valve V–83, with handle 73 (FIG. 2), which is in convenient reach of the planter. By movement of the handle 73 oil may be admitted to either end of the cylinder C–81, thereby to rock the sleeve 86 on its pivots and hence to shift the lateral position of the packing wheel.

Wherever the term "tractor" is employed herein or in the appended claims it is intended to cover any kind of a vehicle.

In use the tractor driver guides the tractor along the course and a planter sits in the seat behind the tractor on the control carriage beside the colter disk and packing wheel. As soon as the colter disk opens a furrow, the planter inserts a seedling tree into the open furrow immediately beside the disk and then rocks the treadle 75 downwardly. This stops the tractor by declutching it and applying the brakes, elevates the colter disk and brings the packing wheel downwardly into contact with the ground behind the seedling and moves it forwardly over the ground to a point forwardly of the seedling by a small amount so as to pack the earth back about the base of the seedling both rearwardly and forwardly thereof. The operator then reverses the treadle 75, whereupon the brake is released, the clutch is re-engaged so as to start the tractor and with a slight dwell the colter disk is lowered into contact with the ground while at the same time the packing wheel is elevated. The tractor travels slowly so that the periodic stopping and starting can be effected without difficulty. The seedlings are set about every 4 to 6 feet, although distance may be varied by the planter who controls the stopping and starting in accordance with the conditions of the ground or the type of seedling being set out.

It should be understood that the present disclosure is for the purpose of illustration only and that this invention includes all modifications and equivalents which fall within the scope of the appended claims.

I claim:

1. Apparatus for planting seedling trees comprising a tractor including a clutch, a brake and frames pivotally supported at their forward ends to the tractor, means suspending the frames rearwardly of their pivoted forward ends, substantially parallel with the ground, said means permitting upward movement of the frames and including means for damping downward movement, a shaft on one frame, a colter and packing wheel, means mounting the colter and packing wheel on the shaft in angularly spaced relation, means on said one frame operable to rock the packing wheel or colter into engagement with the ground and simultaneously to lift the other out of the ground so as to make a furrow and close it, a double-acting cylinder and piston assembly connected to said last means for effecting operation thereof, the other frame mounting a seat for the planter, a treadle on said other frame, and a treadle-operated control valve, means connecting the control valve to the double-acting cylinder and piston assembly, said control valve being operable to effect movement of the piston in the cylinder in opposite directions, a control shaft on the tractor operably connected to the clutch and brake so as to declutch the tractor wheels and simultaneously apply the brake, and means operable, when the control valve is operated by the treadle to effect movement of said piston in a direction to raise the colter, to effect operation of said control shaft to stop the tractor.

2. Apparatus for planting seedling trees comprising a tractor including a clutch, a brake and a hydraulic system for effecting operation of said clutch and brake, a frame including ground-engaging instrumentalities and means supporting them on the frame for alternate movement into operative position, a carriage for supporting an operator, a control on the carriage associated with the hydraulic system operable from said carriage, said hydraulic system including first and second double-acting cylinder and piston assemblies, and a valve for effecting movement of the pistons in the cylinders in opposite directions, the piston in the first cylinder and piston assembly being operably connected to the first-named means for effecting alternate movement of said instrumentalities into operative position, and the second cylinder and piston assembly being operably connected to the clutch and brake to effect their operation, the cylinder of the first cylinder and piston assembly being longer than the cylinder of the second cylinder and piston assembly and providing delay action so that the clutch and brake are operated prior to operation of the instrumentalities.

3. Apparatus for planting seedling threes comprising, in combination, a tractor, a vehicle mounting instrumentalities alternately movable into operative position in contact with the ground, and an operator's carriage, said tractor including a brake, brake rod and clutch treadle, a treadle on the tractor for effecting operation of the brake rod to apply the brake, a loose sleeve on the brake rod, a double-acting cylinder and piston assembly pivotally connected at one end to the carriage, a first rod connected at one end to the sleeve, said rod being connected at its other end to the piston in the cylinder and piston assembly and being operable thereby to turn the sleeve on the brake rod, lost motion elements carried by the sleeve and brake rod to effect a positive rotation of the brake rod when the sleeve is rotated a predetermined amount, a second rod connected at one end to the sleeve, a lost motion element connecting the other end of said rod to the clutch treadle so that depression of the clutch treadle by the driver will not rotate the sleeve, a second double-acting hydraulic cylinder and piston assembly of greater length than the first hydraulic double-acting cylinder and piston assembly mounted on the carriage, operably connected to the instrumentalities to effect operation thereof, and a valve on the carriage operable to effect movement of the pistons in the two cylinders simultaneously whereby the first cylinder and piston assembly is caused to operate in advance of the second.

4. Apparatus for planting seedling trees according to claim 1, wherein the last-named means is a second double-acting cylinder and piston assembly operably connected to the control shaft, reversible by the control valve, the cylinder of the second cylinder and piston assembly having a shorter effective stroke than the cylinder of the first-named cylinder and piston assembly.

5. Apparatus for planting seedling trees, comprising a tractor having a clutch, brakes and rods for effecting their operation, a frame connected to the tractor, a shaft on the frame, a colter disk and packing wheel, means on the shaft supporting the colter disk and packing wheel in angularly spaced relation to each other for rocking movement about the axis of the shaft, so that when the disk is engaged with the ground the packing wheel is elevated and vice versa, first motion-transmitting means movable a predetermined amount connected to the clutch and brake rod of the tractor, operable in one direction to disengage the clutch and apply the brakes, and in the other direction to re-engage the clutch and release the brakes, second motion-transmitting means movable a predetermined greater amount than the first motion-transmitting means connected to said shaft, operable in one direction to raise the colter and in the other direction to lower it, and motion producing means to which the first and second motion-transmitting means are connected for effecting operation of said motion-transmitting means simultaneously.

6. Apparatus for planting seedling trees, comprising a frame movable along the ground in a predetermined direction and a tractor for effecting movement thereof, said tractor having brakes, a horizontally disposed rock shaft on the frame arranged transversely to the direction of movement thereof, angularly disposed arms fixed to the shaft, a colter disk mounted on the distal end of one arm, a packing wheel mounted on the distal end of the other arm, a fluid motor having a stroke of predetermined length operably connected to the brakes of the tractor for applying and releasing the brakes, a second motor having a stroke of predetermined greater length operably connected to said shaft for effecting rotation thereof to raise and lower the colter, and means for supplying fluid pressure to said motors simultaneously.

7. Apparatus for planting seedling trees, power-operated means, a frame, means connecting the frame to the power-operated means for effecting movement thereof, a carriage connected to the power-operated means, means on the carriage for starting and stopping the power-operated means, a shaft on the frame, a pair of rotatable ground-engaging instrumentalities, one of which is a colter disk and the other of which is a packing wheel, movable means mounting the colter disk and packing wheel on the shaft in angularly spaced relation for successive movement about a common center to bring one or the other into engagement with the ground, and a motor operably connected to the movable means for effecting movement of the instrumentalities, control means on the power-operated means operably connected to the starting and stopping means and to the motor on the frame, said control means being movable in one direction by the operator to effect operation of the means for starting and stopping the power-operated means, and to effect operation of the motor in a direction to elevate the colter, and movable in the opposite direction to effect operation of the means for starting and stopping the power-operated means, and to effect operation of the motor in a direction to lower the colter.

8. Apparatus for planting seedling trees according to claim 7, wherein there is pivotal means for connecting the frame to the tractor including a damper for absorbing shock.

9. Apparatus for planting seedling trees according to claim 7, wherein there is pivotal means connecting the carriage to the tractor including a damper for absorbing shock.

10. Apparatus for planting seedlings comprising a tractor towed frame, instrumentalities including a colter disk and packing wheel engageable with the ground successively to open a furrow for reception of a seedling and to close the furrow about the base of the seedling, means supporting the colter disk and packing wheel on the frame for rocking movement of one into an operable position and the other to an elevated inoperative position and vice versa, said disk and wheel being spaced transversely of the frame with the plane of the colter disk toed outwardly with respect to the forward end of the frame and said packing wheel having a transversely beveled peripheral surface.

11. Apparatus for planting seedlings comprising a frame, means for pivotally connecting the frame to a tractor for trailing therebehind and for pivotal movement about a horizontal axis, movable means on the frame rearwardly of the means connecting it to the tractor, ground-engaging instrumentalities in the form of a colter disc and packing wheel mounted on said movable means for movement alternately into engagement with the ground, successively to open a furrow in the ground for the reception of a seedling and to close the furrow about the base of the seedling after it has been inserted in the furrow, and means on the frame, connected to the movable means for effecting movement thereof and hence of the ground-engaging instrumentalities alternately into operative position with the ground, each of the instrumentalities, in its operative position, being adapted to support the entire weight of the apparatus rearwardly of the pivot connection.

12. Apparatus for planting seedlings comprising a tractor towed frame, means mounting instrumentalities on the frame including a colter disk having a convex side and a packing wheel for rotation about horizontal axes and for movement successively into engagement with the ground to open a furrow in the ground for reception of a seedling and thereafter to close the furrow about the base of the seedling after it has been inserted into the furrow, a deflector adjacent the convex side of the colter disk diverging from the surface thereof outwardly and rearwardly of its axis of rotation, and means on the frame supporting the deflector for upward movement relative to the disk.

13. Apparatus for planting seedlings comprising a tractor towed frame, means mounting instrumentalities on the frame including a colter disk having a convex side and a packing wheel for movement successively into engagement with the ground to open a furrow in the ground for reception of a seedling and thereafter to close the furrow about the base of the seedling after it has been inserted into the furrow, an arm, means supporting the arm at its upper end on the frame with its lower end adjacent the convex side of the colter disk for movement outwardly away from the convex side of the colter disk, a deflector on the lower end of the arm movable outwardly therewith, and yieldable means opposing said outward movement of the arm.

14. Apparatus for planting seedlings comprising a tractor towed frame, means mounting instrumentalities on the frame including a colter disk having a convex side and a packing wheel for movement successively into engagement with the ground to open a furrow in the ground for reception of the seedlings and thereafter to close the furrow about the base of the seedlings after they have been inserted into the furrow, and arm, means pivotally supporting the upper end of the arm on the frame for pivotal movement about a horizontal axis, and a deflector fixed to the lower end of the arm adjacent the convex side of the disk, said deflector diverging outwardly and rearwardly from said convex surface and being movable upwardly relative to the disk upon encountering an obstacle in the course of its forward movement with the disk.

15. A planter comprising a vehicle, means mounting a colter disk and guard on the vehicle, said colter disk being concavo-convex and said guard being substantially flat, and arranged opposite the convex side of the disk so as to make a rearwardly diverging angle therewith, said mounting means including a pivoted arm supporting the colter disk for upward yielding movement when the latter passes over an obstacle and said means mounting the guard including a yieldable coupling permitting lateral movement of the arm away from the disk so that the guard may pass around as well as over an obstacle.

16. Apparatus for planting seedlings comprising a tractor towed frame, movable means mounting instrumentalities on the frame, including a colter disk having a concave and convex side and a packing wheel for movement into engagement with the ground to open a furrow in the ground for reception of a seedling, and thereafter to close the furrow about the base of the seedling after it has been inserted in the furrow, a deflector adjacent the convex side of the disk, an arm supporting the deflector on the frame, means connecting the upper end of the arm to said movable means mounting the colter disk for transverse movement relative to the frame, and a spring operating on the arm in a direction to oppose such transverse movement of the arm and hence of the deflector at the lower end thereof.

17. A planter comprising a vehicle movable in a predetermined direction, means mounting a concave-convex colter disk on the vehicle for rotation about a horizontal axis disposed transversely of the vehicle and for engagement of its peripheral edge with the ground, a litter guard and means yieldably supporting the litter guard on the vehicle at the convex side of the colter disk adjacent the rear side of the axis of rotation thereof with respect to the direction of movement of the vehicle, with the ground-engaging edges of the colter disk and guard diverging rearwardly.

18. Apparatus for planting seedlings comprising a frame and means for pivotally connecting one end of the frame to a tractor, a transverse, horizontally disposed shaft on the frame situated rearwardly of the means pivotally connecting the frame to the tractor, transversely spaced arms on the shaft, a colter disk rotatably mounted on one arm, a packing wheel rotatably mounted on the other arm, said arms being angularly spaced relative to the axis of the shaft means for effecting alternate engagement of the colter and packing wheel with the ground successively to open a furrow for reception of a seedling and closing the furrow about the base of the seedling, and means connecting the one of the spaced arms supporting the packing wheel to the shaft for angular adjustment about a horizontal axis at right angles to the shaft.

19. Apparatus according to claim 18, wherein said arm supporting the packing wheel has upper and lower portions, and means connecting the portions for angular adjustment thereof relative to each other about the longitudinal axis of the arm.

References Cited in the file of this patent
UNITED STATES PATENTS

| | | |
|---|---|---|
| 641,498 | Crain | Jan. 16, 1900 |
| 697,479 | Hardcastle | Apr. 15, 1902 |
| 834,680 | Pelton | Oct. 30, 1906 |
| 1,425,372 | Dittemore | Aug. 8, 1922 |
| 1,683,000 | Trauger | Sept. 4, 1928 |
| 1,690,055 | Churchill | Oct. 30, 1928 |
| 1,895,962 | Bateman et al. | Jan. 31, 1933 |
| 2,534,798 | Schneider | Dec. 19, 1950 |
| 2,559,183 | Barnett | July 3, 1951 |
| 2,598,390 | Johnson | May 27, 1952 |
| 2,691,948 | Jeffreys | Oct. 19, 1954 |
| 2,695,577 | Webster | Nov. 30, 1954 |
| 2,704,524 | McIntyre | Mar. 22, 1955 |
| 2,765,756 | Webster | Oct. 9, 1956 |
| 2,796,997 | Iserman | June 25, 1957 |